July 1, 1924.
J. F. LAMB
1,499,742
POSITIVELY ACTUATED CLUTCH FOR WASHING MACHINES
Filed Oct. 6, 1920
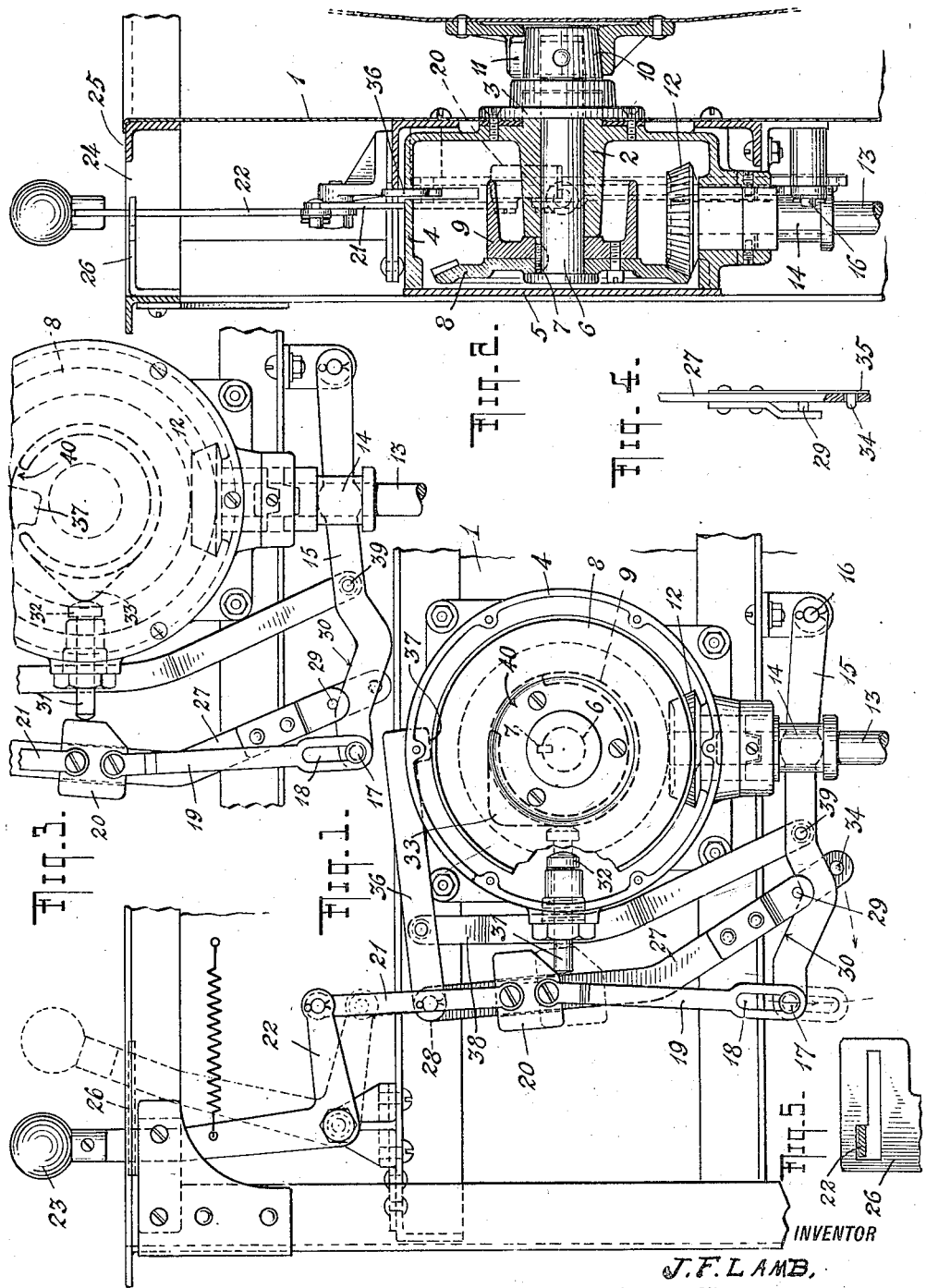
INVENTOR
J. F. LAMB,
BY
ATTORNEYS Patented July 1, 1924.

1,499,742

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

POSITIVELY-ACTUATED CLUTCH FOR WASHING MACHINES.

Application filed October 6, 1920. Serial No. 415,185.

*To all whom it may concern:*

Be it known that I, JOSEPH F. LAMB, a citizen of the United States, residing at New Britain, county of Hartford, State of Connecticut, have invented a certain new and useful Improvement in Positively-Actuated Clutches for Washing Machines, of which the following is a full, clear, and exact description.

This invention relates to improvements in washing machines and has for its object to provide a novel means for connecting the cylinder of a washing machine with a source of power. It also has for its object to provide means for disconnecting the cylinder when it reaches a certain definite position so that the cylinder will stop substantially in a predetermined position. It also has for its object to provide a positively actuated stop which will stop the cylinder only when the clutch is fully disengaged. It also has for its object to provide a simple and effective means for assembling a driven shaft adapted to be coupled to the washing cylinder.

The following is a description of an apparatus embodying the invention, reference being had to the accompanying drawings, in which, Fig. 1 shows a side elevation of the same, parts being broken away;

Fig. 2 is a vertical section of the same through the axis of the shaft driving the washing cylinder;

Fig. 3 is a view showing the relation of the parts just after the clutch has been disengaged; and, Figs. 4 and 5 are details.

Referring more particularly to the drawings, 1 is one side of the tub of a washing machine, to which a bearing 2 is clamped by a plate 3. Integral with this bearing is a housing 4, having a removable face-plate 5 secured thereto. Revolvably mounted in this bearing 2 is a shaft 6 having an integral head 7. This shaft carries a gear 8 and a cam cylinder 9 splined thereto and is held in position by a hub 10 riveted thereto, this hub 10 being provided with an integral key 11, which hub and key fit a corresponding recess and slot in a socket on one end of the washing cylinder. This is a very simple shaft and bearing construction which does away with the use of all nuts in connection with the revolving shaft 6. It permits the parts 8 and 9 to be assembled upon the shaft 6, which is then slipped into the bearing 2 and held thereby the hub 10. 12 is a beveled pinion which is loosely mounted upon a power-shaft 13 driven by an electric motor in the ordinary way. This pinion is put in position before the shaft 6 and parts carried thereby are introduced into the hollow bearing 2. The lower end of the sleeve of this pinion is provided with a clutch surface with which a spool clutch 14 is adapted to make engagement and disengagement. Between the flanges of the spool clutch is a portion of a lever actuator 15, one end of which is pivoted to an abutment at 16 while the other end is provided with a pin 17 which works in a slot 18 in the lower end of a link 19. This link is pivotally connected to a block 20, to which is also pivotally connected a link 21 which is actuated by the bell-crank lever 22, the operating handle 23 of which projects through a slot 24 in the upper surface 25 of the washing machine. This slot is provided with a plate 26 projecting into the normal path of the upright arm of the lever 22 and around which that lever can be swung so that in one position the lever is held by that plate in the position shown in full lines in Fig. 1, while in the other position it is in advance of the plate in the position shown in dotted lines in that figure. When the lever handle 23 is retracted, as shown in Fig. 1, the block 20 is raised to the position shown, at which time the clutch member 14 is held in engagement with the clutch face of the pinion 12. The block 20 slides upon a lever 27 pivoted at its upper end to lever 36 for a purpose to be disclosed hereafter and having at its lower end a pin 29 which rides upon the upper surface of the lever 15. This upper surface at that point is provided with an upward incline 30. When the lever 27 is moved to the left, the pin 29, acting upon the inclined surface 30, forces the lever 15 downward so as to cause the movable clutch member 14 to disengage the face on the lower end of the gear 12, as shown in Fig. 3. In order to positively operate the lever 27 at a predetermined time relative to the revolution of the washing cylinder, I provide a pin 31 carried by the housing 4, whose head 32 lies in the path of the cam 33, formed on the cam drum 9, so that as the cam 33 revolves, the pin, if in the position shown in dotted lines in Fig. 1, would be forced by the cam to the position shown in full lines in Fig. 1.

The lower end of the lever 27 has a detent pin 34 carried by a spring 35, secured to said lever 27, which, when the parts are in the position shown in Fig. 1, is adapted to engage the under side of the lever 15 and hold it in elevated position after the handle 23 has been moved forward to the position shown in dotted lines and until the cam 33 engages and actuates the pin 31, thus insuring that the lever 15 and the removable clutch member 14 will not fall downward by gravity so as to disengage the movable clutch member from the gear 12 until the pin 31 is positively actuated by the cam 33.

In operating the device as thus far described, the gear 12 is operatively connected to the power-shaft by moving the handle 23 to the left, which causes, through the links and lever 15, the clutch member 14 to rise so as to make engagement with the clutch face on the lower end of the sleeve of the pinion 12. When it is desired to stop the machine, the handle 23 is moved sidewise so as to escape the notch in the plate 26 and forward to the position shown in dotted lines, resulting in lowering the block 20 to the position shown in dotted lines in Fig. 1, at which time the pin 31 will be forced thereby to the position shown in dotted lines. The cam 33 will then engage the pin 31, pushing it to the position shown in full lines and by its engagement with the block 20 in its lowered position cause that block to move sidewise and carry the lever 27 to the position shown in Fig. 3, depressing the lever 15 and positively withdrawing the movable clutch member from the clutch face of the gear 12. The cylinder will thereupon stop. When the cylinder contains clothes, it will stop almost immediately, so that it will stop substantially in a predetermined position, which position is preferably the position in which the door of the cylinder is uppermost.

In this way a simple and positively acting device is secured, and, furthermore, a device in which a movement of the cylinder by hand will not cause the movable clutch member to re-engage the pinion 12 and result in the starting of the cylinder. The cylinder can only be started under power by moving the handle 23 to the position shown in Fig. 1 in full lines.

It is desirable in some instances to provide means for positively holding the cylinder in a fixed position with the door uppermost when the clutch members are separated, and I have provided a positive stop mechanism for accomplishing this result, the same being so related to the movable clutch member that it can only act as a stop for the cylinder when the movable clutch member is entirely disengaged. This insures against accident, since if the stop can act upon the cylinder before the clutch member is disengaged, the power connection is liable to result in breakage of the parts.

In embodying this feature of my invention, I pivot at 28 an additional lever 36 having a downwardly projecting nose 37, which is normally raised above the cam cylinder 9 as shown in Fig. 1, this being accomplished by means of a link 38 whose upper end is pivoted to the lever 36 and whose lower end is pivotally connected to the lever 15 at the point 39. The cam drum is provided with an opening 40 at one side of the cam projection 33 and so disposed that it is adapted to receive the projection 37 of the lever 36 when that lever is in its downward position. The parts, however, are so proportioned that the nose 37 does not enter the opening 40 except when the lever 15 is moved downwardly sufficiently to entirely disengage the clutch member 14 from the clutch face connected to the gear 12, as shown in Fig. 3, which action is positively produced by the cam 33 and only at the time when the cylinder is in the position in which it is desired to have it stop. When the clutch member 14 is thus disengaged and is near the limit of its downward movement, the movement of the lever 15 communicated to the lever 36 through the link 38 is such that the nose 37 enters within the opening 40, both the uncoupling and the entry being timed by the cam 33.

The clutch and stop, being thus interconnected, synchronize properly so that the stop cannot act to hold the cylinder except when the clutch is released and the power is off with the cylinder in the desired position and both are actuated at a definite time by a positively acting cam, being controlled by said cam and neither controlling the other.

The hub 10 is so located upon the shaft 6 with relation to the drum 9 that when the drum 9 is held by the stop 37 the key 11 is on top, so as to be plainly visible when the cylinder is removed and the door of the washing cylinder (not shown) is also in the position at which it should be for the convenient introduction and removal of clothes. By having the key 11 stopped in its upper position it is easy to determne by inspection the proper position for holding the cylinder when it is about to be inserted. The hub 10 supports and centers the socket in which it fits and the key 11 causes it to turn with the shaft 6.

As will be evident to those skilled in the art, my invention permits of various modifications without departing from the spirit thereof or the scope of the appended claims.

What I claim is:

1. In a washing machine, a revolvable shaft, a source of power for driving said shaft, a separable clutch between said shaft and said source of power for connecting said shaft operatively to said source, an actuator engaging said clutch for moving the same to open and closed position, a revolvable cam driven by said shaft and projecting radially therefrom and a member adapted to be moved by said cam so as to cause said actuator to open said clutch, manually actuated means for positively moving said member into and out of position to be moved by said cam co-operating stops acting when engaged to stop the shaft in a predetermined angular position, and connections with the clutch actuating means for bringing the stops into operative relation upon opening the clutch.

2. In a washing machine, a revolvable shaft a source of power for driving said shaft, a separable clutch between said shaft and said source of power for connecting said shaft operatively to said source, an actuator engaging said clutch for moving the same to open and closed position, a revolvable cam driven by said shaft and projecting radially therefrom and a member adapted to be moved by said cam so as to positively move said actuator to open said clutch, and manually actuated means for positively moving said member into and out of position to be moved by said cam, said manually operated means acting to close said clutch when said member is moved thereby out of position to be moved by said cam and means for mechanically holding said member out of such position.

3. In a washing machine, the combination of a shaft adapted to drive a washing cylinder, a beveled gear secured to the said shaft, a beveled pinion engaging said gear and having a clutch face, a power-shaft having at its axis in line with the axis of said beveled pinion, a movable clutch member upon said power-shaft adapted to engage said clutch face upon said beveled pinion, a lever for actuating said movable clutch member, said lever having a cam-surface, a second lever engaging said cam surface to co-operate therewith to actuate the first lever, and means actuated by said gear for moving said second named lever so as to cause said first lever to withdraw said clutch from said clutch surface.

4. In a washing machine, the combination of a shaft adapted to drive a washing cylinder, a beveled gear secured to the said shaft, a beveled pinion engaging said gear and having a clutch face, a power-shaft having its axis in line with the axis of said beveled pinion, a movable clutch member upon said power-shaft adapted to engage said clutch face upon said beveled pinion, a lever for actuating said movable clutch member, said lever having a cam-surface, a second lever engaging said cam-surface, means actuated by said gear for moving said second lever so as to cause said first lever to withdraw said clutch from said clutch surface, said means consisting of a pin, a cam operated by said gear and adapted to engage and move said pin from one position to another, a block making sliding engagement with said second lever, and manually actuated means for moving said block into and out of alinement with the axis of said pin.

5. In a washing machine, the combination of a shaft adapted to drive a washing cylinder, a beveled gear secured to the said shaft, a beveled pinion engaging said gear and having a clutch face, a power-shaft having its axis in line with the axis of said beveled pinion, a movable clutch member upon said power-shaft adapted to engage said clutch-face upon said beveled pinion, a lever for actuating said movable clutch member, said lever having a cam-surface, a second lever engaging said cam surface, means actuated by said gear for moving said second lever so as to cause said first lever to withdraw said clutch from said clutch surface, said means consisting of a pin, a cam operated by said gear and adapted to engage and move said pin from one position to another, a block making sliding engagement with said second lever, a manually actuated third lever for moving said block along said second lever, a link connecting said third lever to said block, and another link linking said block to said first lever, said second link having a lost motion connection at one end.

6. In a washing machine, the combination of a shaft adapted to drive a washing cylinder, a beveled gear secured to the said shaft, a beveled pinion engaging said gear and having a clutch face, a power-shaft having its axis in line with the axis of said beveled pinion, a movable clutch member upon said power-shaft adapted to engage said clutch face upon said beveled pinion, a lever for actuating said movable clutch member, said lever having a cam surface, a second lever engaging said cam surface, means actuated by said gear for moving said second lever so as to cause said first lever to withdraw said clutch from said clutch surface, said means consisting of a pin, a cam operated by said gear and adapted to engage and move said pin from one position to another, a block making sliding engagement with said second lever, a manually actuated third lever for moving said block along said second lever, a link connecting said third lever to said block, and another link linking said block to said first lever, said second link having a lost motion connection at one end, and a spring detent for said first lever holding the same in raised position when said block is in alinement with said pin and before it is actuated thereby.

7. In a washing machine, the combination of a shaft for driving the cylinder, a source of power, a clutch for coupling and uncoupling said shaft with said source, a manually actuated lever for closing said clutch, means for mechanically holding said lever in clutch-opening position, means rotating with said shaft for positively opening said clutch when said cylinder is in a predetermined position and said manually actuated means is released, and a stop actuated by said rotating means synchronously with its operation of said clutch so as to stop said cylinder, said stop being adapted to be withdrawn by said manually actuated lever before said clutch is closed said stop and lever moving substantially in a plane at right angles to said shaft and being pivotally mounted on different axes.

8. In a washing machine, the combination of a tub, a tubular bearing secured to one end thereof, a shaft extending through the bearing, a gear fixed on said shaft outside said tub, and a hub within said tub having a single radially projecting key and secured to the other end of said shaft a cam mounted on the shaft, driving mechanism connected with said gear, and mechanism for connecting and disconnecting said shaft and driving mechanism comprising means actuated by the cam for disconnecting the driving mechanism and shaft.

9. In a washing machine, the combination of a tub, a tubular bearing secured to one end thereof, a shaft extending through the bearing, a gear fixed on said shaft outside said tub, a hub within said tub having a single integral radially projecting key and secured to the other end of said shaft, and clutch mechanism adapted to connect and disconnect said shaft from a source of power, so that said shaft will stop with said key on the upper part of said hub.

10. In a washing machine, the combination of a shaft, a driving mechanism therefor, a clutch between the driving mechanism and shaft, means for opening and closing the clutch comprising a lever engaging one of the clutch members arranged at one side of said shaft, and means for stopping the shaft in a predetermined angular position when the clutch is open comprising a second lever arranged at the opposite side of the axis of said shaft from said first mentioned lever and having a stop thereon, a co-operating stop carried by the shaft, and a link connecting said levers to bring the stops into operative relation upon opening the clutch and for bringing the stops out of operative relation at the start of the movement of said first lever to close the clutch.

JOSEPH F. LAMB.